(12) United States Patent
Okazaki

(10) Patent No.: US 7,131,835 B2
(45) Date of Patent: Nov. 7, 2006

(54) INJECTION MOLDING MACHINE

(75) Inventor: Masanori Okazaki, Akashi (JP)

(73) Assignee: Toyo Machinery & Metal Co., Ltd., Hyogo (JP)

( * ) Notice: Subject to any disclaimer, the term of this patent is extended or adjusted under 35 U.S.C. 154(b) by 170 days.

(21) Appl. No.: 10/803,889

(22) Filed: Mar. 19, 2004

(65) Prior Publication Data
US 2005/0008731 A1    Jan. 13, 2005

(30) Foreign Application Priority Data
Jul. 8, 2003    (JP) .............................. 2003-193697

(51) Int. Cl.
*B29C 45/22*    (2006.01)
(52) U.S. Cl. ........................ 425/570; 425/574; 425/594
(58) Field of Classification Search ................ 425/570, 425/574, 575, 594, 595
See application file for complete search history.

(56) References Cited

U.S. PATENT DOCUMENTS

| | | | | |
|---|---|---|---|---|
| 3,947,196 A | * | 3/1976 | Tribbett et al. .............. | 425/543 |
| 4,165,959 A | * | 8/1979 | Dechavanne ................ | 425/130 |
| 4,699,581 A | * | 10/1987 | Nagasaka et al. ........... | 425/155 |
| 5,007,822 A | * | 4/1991 | Hara et al. .................. | 425/575 |
| 5,219,586 A | * | 6/1993 | Yukihiro et al. ............. | 425/183 |
| 5,431,554 A | * | 7/1995 | Yoshida et al. .............. | 425/183 |
| 5,580,584 A | * | 12/1996 | Mussler et al. .............. | 425/143 |
| 5,855,829 A | * | 1/1999 | Siegrist et al. .............. | 264/40.1 |
| 6,936,214 B1 | * | 8/2005 | Schaffer et al. ........ | 264/328.11 |
| 2002/0110618 A1 | * | 8/2002 | Tsai et al. .................... | 425/574 |

* cited by examiner

*Primary Examiner*—James P. Mackey
*Assistant Examiner*—Emmanuel S. Luk
(74) *Attorney, Agent, or Firm*—Crowell & Moring LLP

(57) ABSTRACT

An injection molding machine having two injection units retained in parallel on one heating cylinder retention member, so that nozzles of the two injection units can touch fixed-side molds by advance of the heating cylinder retention member toward the molds. Two nozzle touch rods having their one ends fixed to a fixed die plate mounted with the molds are disposed symmetrically outside the two injection units respectively. Nut pieces screwed down to ball screw shaft portions of the nozzle touch rods respectively are attached to the heating cylinder retention member rotatably. Two servo motors for driving and rotating the two nut pieces respectively and individually are mounted on the heating cylinder retention member. Thus, in the configuration in which the two injection units are retained on the one heating cylinder retention member, the nozzles of the two injection units can touch the molds with predetermined nozzle touch forces respectively in spite of a difference in whole length between the two injection units, which difference is unavoidable in manufacturing.

3 Claims, 4 Drawing Sheets

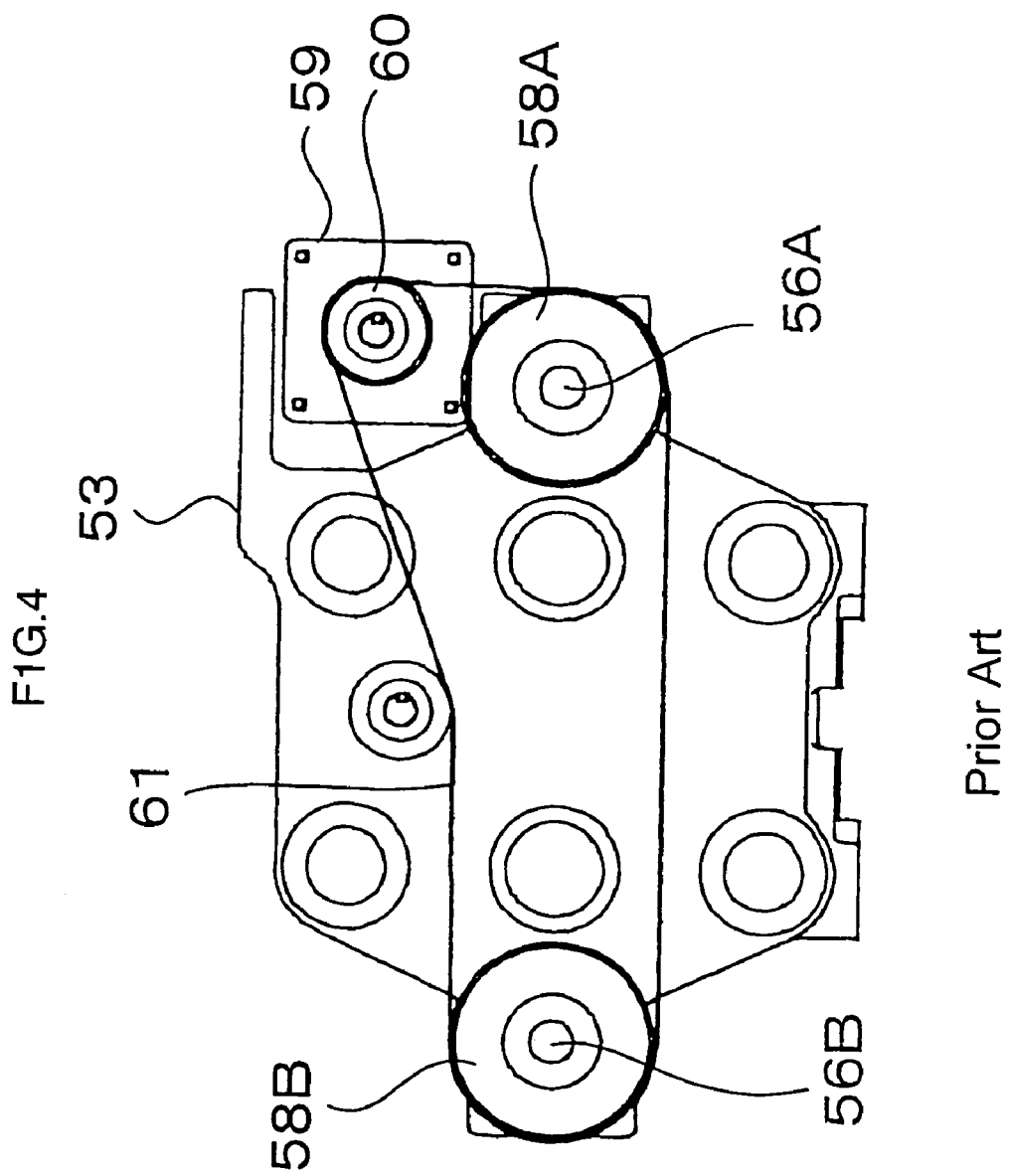

INJECTION MOLDING MACHINE

BACKGROUND OF THE INVENTION

The present invention relates to a technique concerned with nozzle touch in an injection molding machine in which two injection units are retained in parallel on one heating cylinder retention member.

A twin injection unit type injection molding machine in which two injection units are retained in parallel on one heating cylinder retention member can divide and supply raw resin of one and the same lot into the two injection units. Thus, the raw resin is injected concurrently from the two injection units so that the variation in quality between parts molded concurrently can be made as small as possible. For example, in production of optical disk substrates to be laminated to each other, two optical disk substrates molded concurrently and having small variation in optical performance therebetween can be laminated to each other. Thus, an optical disk superior in quality can be formed.

FIGS. 3 and 4 are diagrams showing the configuration of a twin injection unit type injection molding machine manufactured by way of trial by the present inventors before the present inventors conceived the present invention. FIG. 3 is a partially cutaway plan view of a main portion of the injection molding machine, in which a part of a heating cylinder retention member is omitted. FIG. 4 is a right side view of FIG. 3, depicting the whole outline of the heating cylinder retention member.

In FIGS. 3 and 4, the reference numeral 51 represents a fixed die plate; 52A and 52B, fixed-side molds mounted on the fixed die plate and having one and the same shape; 53, a heating cylinder retention member (head stock); 54A and 54B, heating cylinders having their base portions retained on the heating cylinder retention member 53, disposed in parallel with each other and having one and the same shape; 55A and 55B, nozzles attached to the front ends of the heating cylinders 54A and 54B respectively and having one and the same shape; 56A and 56B, nozzle touch rods disposed bilaterally symmetrically outside the two heating cylinders 54A and 54B respectively, having their one ends fixed to the fixed die plate 51, and having one and the same shape; 56A-1 and 56B-1, ball screw shaft portions of the nozzle touch rods 56A and 56B; 57A and 57B, nut pieces retained rotatably by the heating cylinder retention member 53 and screwed down to the ball screw shaft portions 56A-1 and 56B-1 respectively; 58A and 58B, driven pulleys fixedly attached to the nut pieces 57A and 57B respectively; 59, a servo motor provided for nozzle touch and mounted on the heating cylinder retention member 53; 60, a driving pulley fixedly attached to the output shaft of the servo motor 59; and 61, a timing belt hung among the three pulleys, that is, the driving pulley 60 and the driven pulleys 58A and 58B, and for transmitting the rotation of the servo motor 59 (driving pulley 60) to the driven pulleys 58A and 58B.

In the configuration shown in FIGS. 3 and 4, the rotation of the servo motor 59 for nozzle touch is transmitted to the driven pulleys 58A and 58B through the driving pulley 60 and the timing belt 61, so that the nut pieces 57A and 57B rotating together with the driven pulleys 58A and 58B rotate relatively to the ball screw shaft portions 56A-1 and 56B-1 respectively. Thus, the nut pieces 57A and 57B move linearly along the ball screw shaft portions 56A-1 and 56B-1 respectively so that the heating cylinder retention member 53 and hence the two injection units move linearly together with the nut pieces 57A and 57B.

Nozzle touch of the two injection units is performed as follows. That is, when the nozzles 55A and 55B of the two injection units are separated from the fixed-side molds 52A and 52B so as not to touch them respectively, the servo motor 59 is driven to rotate in a predetermined direction. As a result, due to the aforementioned transmission system, the heating cylinder retention member 53 (two injection units) is driven to advance toward the molds so that the front ends of the nozzles 55A and 55B of the two injection units are pressed onto the peripheries of resin injection holes of the fixed-side molds 52A and 52B respectively (FIG. 3 shows the nozzle touch state). In the nozzle touch state, the servo motor 59 keeps generating predetermined torque so as to retain a predetermined nozzle touch force.

However, in the twin injection unit type injection molding machine in which two injection units are retained in parallel on one heating cylinder retention member 53 as described above, the two injection units indeed have totally the same shape in design, but there is a dimensional error within a tolerance between the paired injection units. Due to the dimensional error, which is unavoidable in manufacturing, there occurs a difference of about 0.1–0.2 mm in whole length between the paired injection units.

When there is a difference in whole length between the two injection units in such a manner, for example, when the whole length of the upper injection unit is longer than the whole length of the lower injection unit in FIG. 3, the nozzle 55A of the upper injection unit touches the mold earlier. Once the nozzle 55A of the upper injection unit is pressed onto the mold with a predetermined nozzle touch force, the power of the servo motor 59 does not act to press the nozzle 55B of the lower injection unit further toward the mold though the nozzle 55B of the lower injection unit has not yet obtained a predetermined nozzle touch force. Thus, the nozzle 55B of the lower injection unit is short of the nozzle touch force. The arrows in FIG. 3 schematically show a difference in nozzle touch force. A relation in force size opposite to the arrowed relation will be established if the whole length of the lower injection unit is longer than the whole length of the upper injection unit. Such a situation is unavoidable due to the configuration in which the driven pulleys 58A and 58B of the two injection units are driven concurrently by the single servo motor 59 for nozzle touch. Thus, once one of the injection units is short of nozzle touch force as described above, there occurs a problem that resin leaks from the front end of the nozzle of the injection unit short of the nozzle touch force.

SUMMARY OF THE INVENTION

The present invention was developed in consideration of the foregoing problem. It is an object of the present invention to provide a twin injection unit type injection molding machine having two injection units retained in parallel on one heating cylinder retention member, wherein nozzles of the two injection units can touch molds with predetermined nozzle touch forces respectively in spite of a difference in whole length between the two injection units, which difference is unavoidable in manufacturing.

In order to attain the foregoing object, the present invention provides an injection molding machine in which two injection units are retained in parallel on one heating cylinder retention member, and the heating cylinder retention member is advanced toward fixed-side molds so that nozzles of the two injection units can touch the molds respectively. The injection molding machine is designed so that two nozzle touch rods having their one ends fixed to a fixed die plate mounting with the molds are disposed symmetrically outside the two injection units, and nut pieces screwed down to ball screw shaft portions of the nozzle touch rods respectively are attached rotatably to the heating cylinder retention member, while two servo motors for driving and rotating the two nut pieces respectively and individually are mounted on the heating cylinder retention member.

In that event, the two servo motors keep generating predetermined torque when the nozzles are touching the molds. In addition, the two injection units are manufactured in one and the same specification, so that nozzle touch forces of the two injection units have values substantially equal to each other in spite of a difference of about 0.1–0.2 mm in whole length between the two injection units.

According to the present invention, in a twin injection unit type injection molding machine in which two injection units are retained in parallel on one heating cylinder retention member, nozzles of the two injection units can be made to touch molds surely with predetermined nozzle touch forces respectively in spite of a difference in whole length between the two injection units, which difference is unavoidable in manufacturing.

BRIEF DESCRIPTION OF THE DRAWINGS

FIG. 4 is a right side view of FIG. 3, depicting the whole outline of the heating cylinder retention member.

DETAILED DESCRIPTION OF PREFERRED EMBODIMENT

An embodiment of the present invention will be described below with reference to the drawings.

Figure 1:
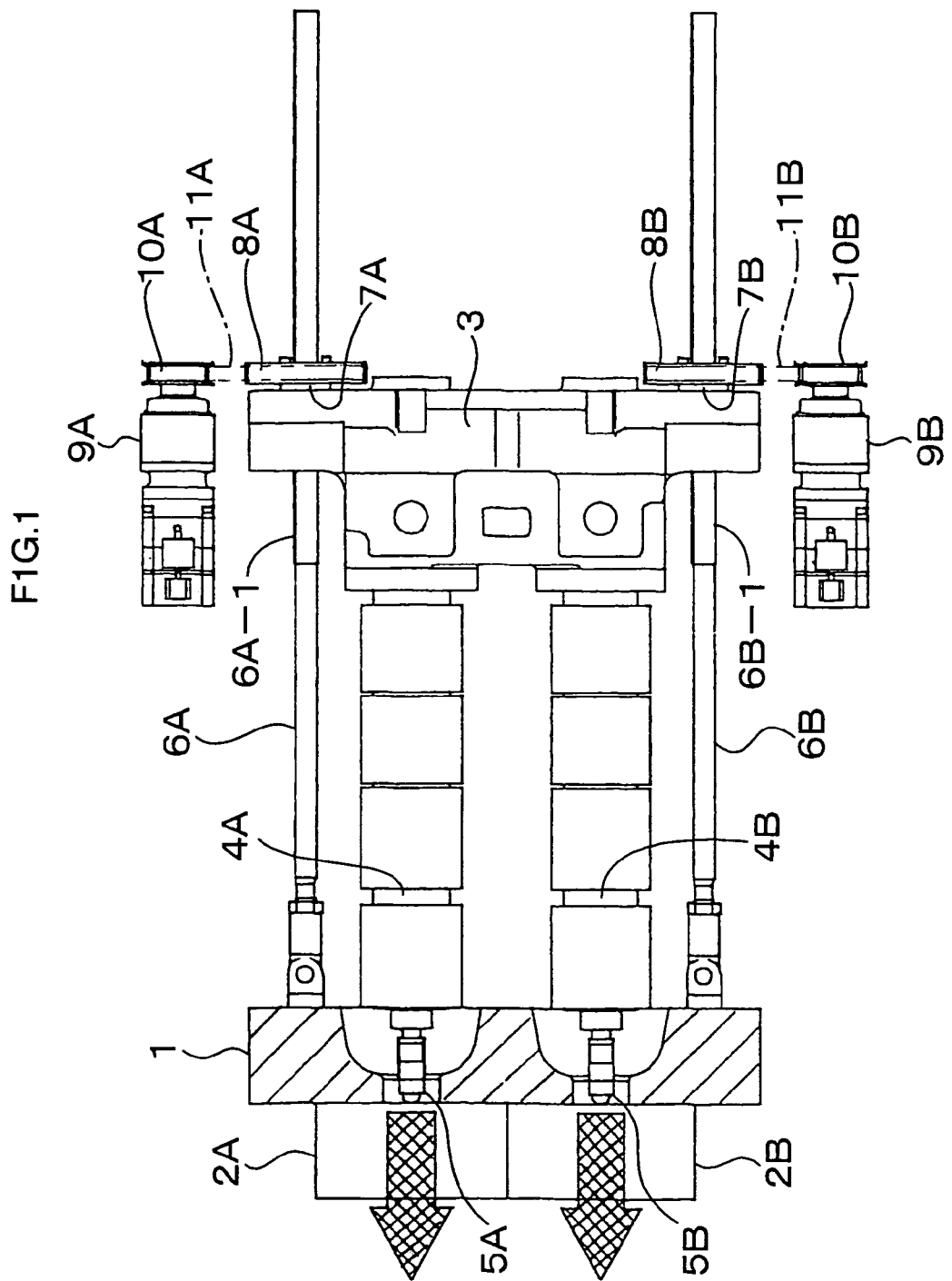
FIG. 1 is a partially cutaway plan view of a main portion of a twin injection unit type injection molding machine according to an embodiment of the present invention, in which a part of a heating cylinder retention member is omitted.
Figure 2:
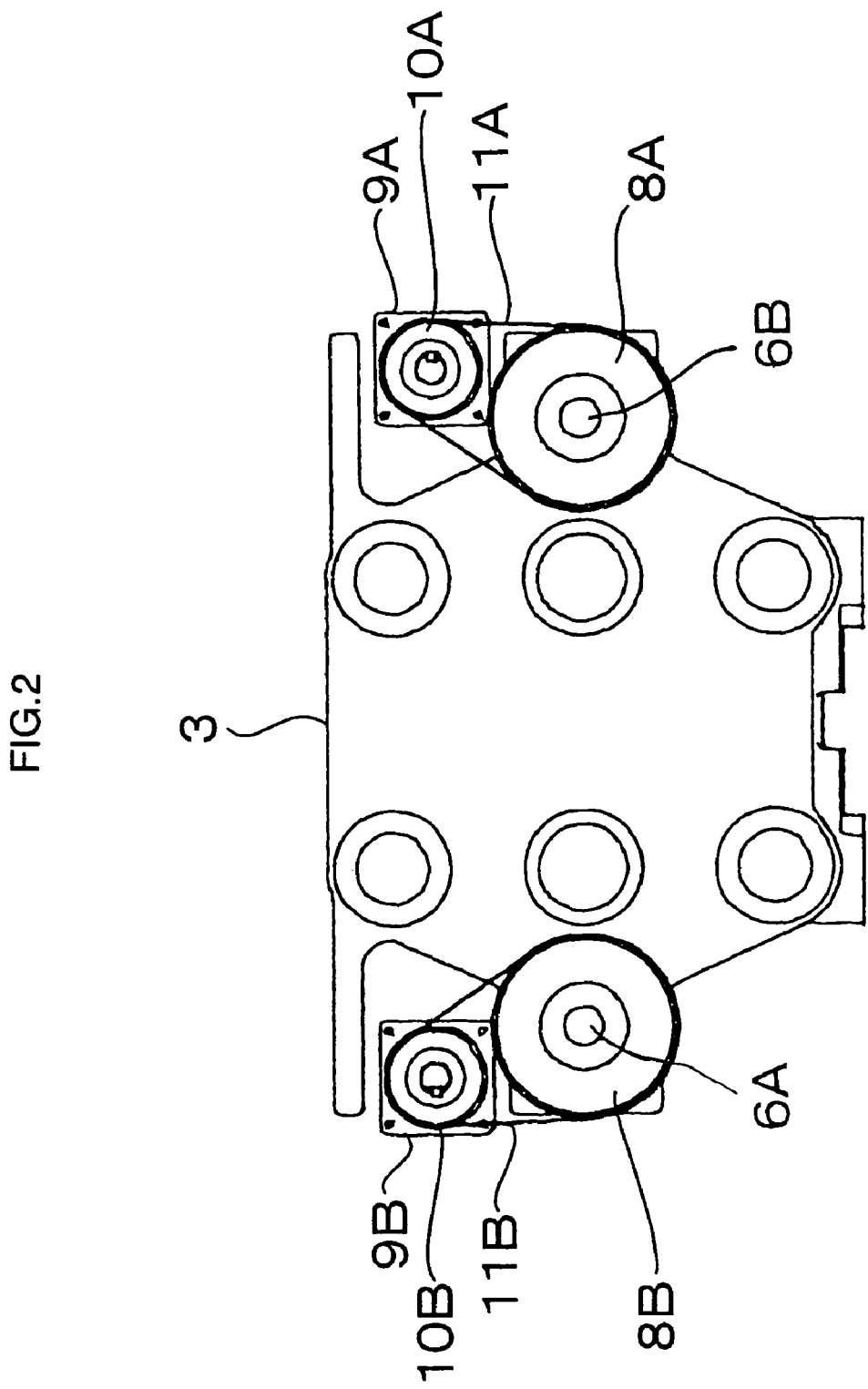
FIG. 2 is a right side view of FIG. 1, depicting the whole outline of the heating cylinder retention member.
Figure 3:
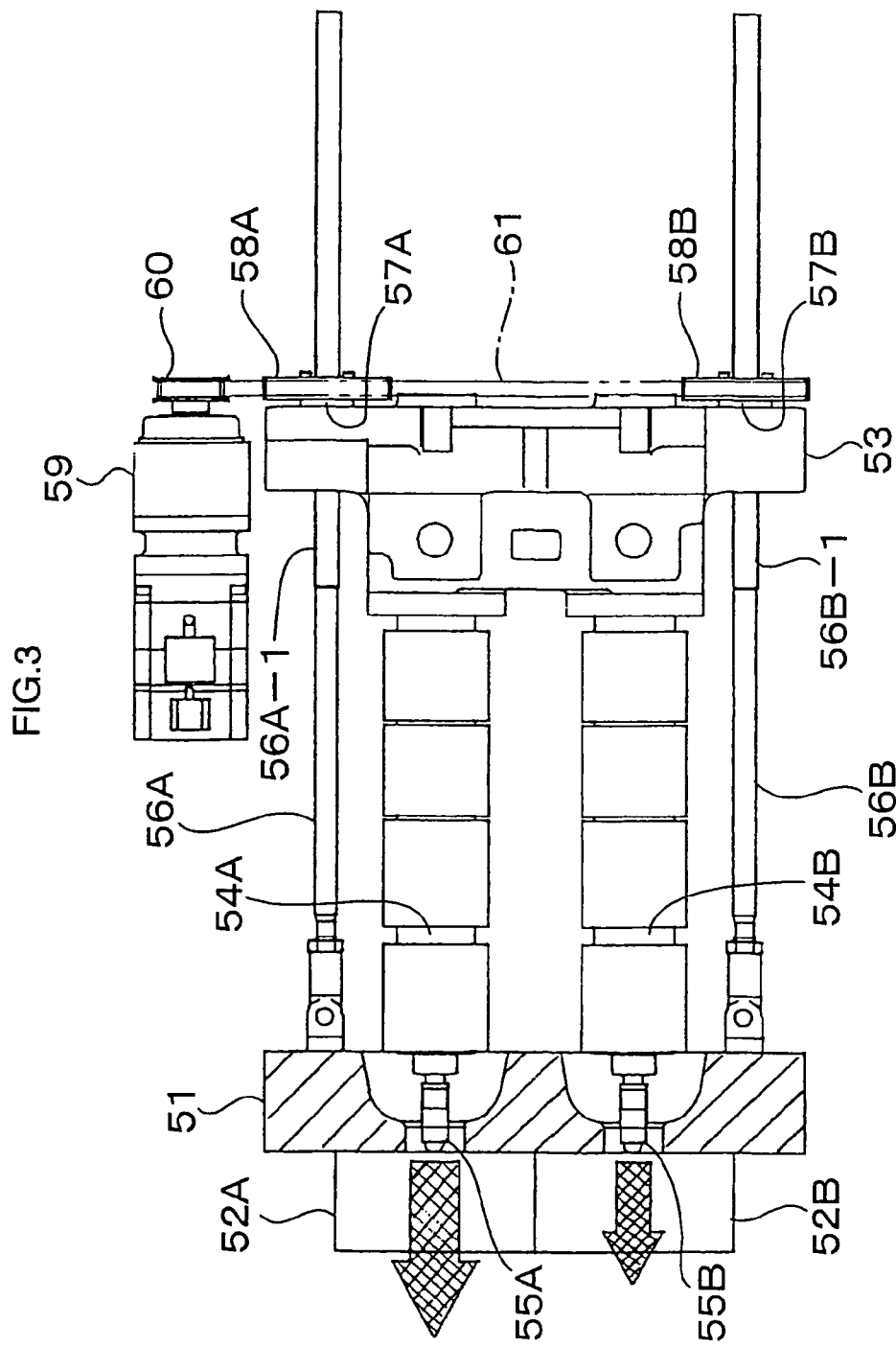
FIG. 3 is a partially cutaway plan view of a main portion of a twin injection unit type injection molding machine in the background art, in which a part of a heating cylinder retention member is omitted.

FIG. 1 is a partially cutaway plan view of a main portion of a twin injection unit type injection molding machine according to an embodiment of the present invention (hereinafter referred to as "this embodiment"), in which a part of a heating cylinder retention member is omitted. FIG. 2 is a right side view of FIG. 1, depicting the whole outline of the heating cylinder retention member.

In FIG. 1, the reference numeral 1 represents a fixed die plate; 2A and 2B, fixed-side molds mounted on the fixed die plate and having one and the same shape; 3, a heating cylinder retention member (head stock); 4A and 4B, heating cylinders having their base portions retained on the heating cylinder retention member 3, disposed in parallel with each other and having one and the same shape; 5A and 5B, nozzles attached to the front ends of the heating cylinders 4A and 4B respectively and having one and the same shape; 6A and 6B, nozzle touch rods disposed bilaterally symmetrically outside the two heating cylinders 4A and 4B respectively, having their one ends fixed to the fixed die plate 1, and having one and the same shape; 6A-1 and 6B-1, ball screw shaft portions of the nozzle touch rods 6A and 6B; 7A and 7B, nut pieces retained rotatably by the heating cylinder retention member 3 and screwed down to the ball screw shaft portions 6A-1 and 6B-1 respectively; 8A and 8B, driven pulleys attached fixedly (or formed integrally) to the nut pieces 7A and 7B respectively; 9A and 9B, servomotors provided for nozzle touch, mounted on the heating cylinder retention member 3 and having one and the same performance; 10A and 10B, driving pulleys fixedly attached to the output shafts of the servo motors 9A and 9B respectively; 11A, a timing belt hung between the driving pulley 10A and the driven pulley 8A and for transmitting the rotation of the servo motor 9A (driving pulley 10A) to the driven pulley 8A; and 11B, a timing belt hung between the driving pulley 10B and the driven pulley 8B and for transmitting the rotation of the servo motor 9B (driving pulley 10B) to the driven pulley 8B.

In the configuration shown in FIGS. 1 and 2, the two servo motors 9A and 9B for nozzle touch are rotated synchronously. The rotation of the servo motor 9A is transmitted to the driven pulley 8A through the driving pulley 10A and the timing belt 11A, so that the nut piece 7A rotating together with the driven pulley 8A rotates relatively to the ball screw shaft portion 6A-1. Thus, the nut piece 7A moves linearly along the ball screw shaft portion 6A-1. On the other hand, the rotation of the servo motor 9B is transmitted to the driven pulley 8B through the driving pulley 10B and the timing belt 11B, so that the nut piece 7B rotating together with the driven pulley 8B rotates relatively to the ball screw shaft portion 6B-1. Thus, the nut piece 7B moves linearly along the ball screw shaft portion 6B-1. As a result, the heating cylinder retention member 3 and hence the two injection units move linearly together with the nut pieces 7A and 7B.

In this embodiment, nozzle touch of the two injection units is performed as follows. That is, when the nozzles 5A and 5B of the two injection units are separated from the fixed-side molds 2A and 2B so as not to touch them respectively, the two servo motors 9A and 9B are driven to rotate synchronously in a predetermined direction. As a result, due to the aforementioned transmission system, the heating cylinder retention member 3 (two injection units) is driven to advance toward the molds so that the front ends of the nozzles 5A and 5B of the two injection units are pressed onto the peripheries of resin injection holes of the fixed-side molds 2A and 2B respectively (FIG. 1 shows the nozzle touch state). In the nozzle touch state, each of the two servo motors 9A and 9B keeps generating predetermined torque so as to retain a predetermined nozzle touch force.

Incidentally, the two servo motors 9A and 9B may be replaced by geared motors with brakes or the like. When the paired motors are selected to be geared motors with brakes, nozzle touch is achieved by predetermined torque, and then the brakes are turned on to retain the nozzle touch force.

In this embodiment, as described above, the driven pulley 8A (nut piece 7A) on one injection unit side and the driven pulley 8B (nut piece 7B) on the other injection unit side are driven to rotate individually by the servo motors 9A and 9B provided exclusively thereto respectively. Accordingly, when there is a difference in whole length between the two injection units due to an error unavoidable in manufacturing as described previously, for example, when the whole length of the upper injection unit is longer than the whole length of the lower injection unit in FIG. 1, the nozzle 5A of the upper injection unit indeed touches the mold earlier. However, after the nozzle 5A of the upper injection unit is pressed onto the mold with a predetermined nozzle touch force, the nozzle 5B of the lower injection unit is pressed onto the mold by the rotating force (output torque) of the servo motor 9B on the lower injection unit side till a predetermined nozzle touch force can be obtained. That is, in this embodiment, the ball screw mechanism on one injection unit side and the ball screw mechanism on the other injection unit side are driven individually and independently. Accordingly, even after a predetermined nozzle touch force is obtained on one injection unit side, the heating cylinder retention member 3 can be tilted slightly by the ball screw mechanism on the other injection unit side. Thus, a predetermined nozzle touch force can be obtained also on the other injection unit side. As a result, as shown by the arrows in FIG. 1, the nozzle touch forces of the two injection units can have predetermined values substantially equal to each other even if there is a difference of about 0.1–0.2 mm in whole length between the two injection units. It is therefore possible to surely prevent the situation in which resin leakage occurs due to shortage of nozzle touch force as in the background art.

Incidentally, the aforementioned embodiment was applied to a horizontal injection molding machine having the axes of injection units disposed in parallel with the floor face on which the machine was installed, by way of example. Not to say, the present invention is also applicable to a vertical injection molding machine having the axes of injection units disposed perpendicularly to the floor face on which the machine is installed.

What is claimed is:

1. An injection molding machine comprising:
   a heating cylinder retention member;
   two injection units retained in parallel on said heating cylinder retention member;
   fixed-side molds;
   a fixed die plate mounting with said molds;
   two nozzle touch rods having their one ends fixed to said fixed die plate and disposed symmetrically outside said two injection units;
   nut pieces screwed down to ball screw shaft portions of said nozzle touch rods respectively, and attached rotatably to said heating cylinder retention member; and
   two servo motors mounted on said heating cylinder retention member and for driving and rotating said two nut pieces respectively and individually;
   wherein said heating cylinder retention member is advanced toward said molds so that nozzles of said two injection units can touch said molds respectively.

2. An injection molding machine according to claim 1, wherein said two servo motors keep generating predetermined torque when said nozzles are touching said molds.

3. An injection molding machine according to claim 1, wherein said two injection units are manufactured in one and the same specification, so that nozzle touch forces of said two injection units have values substantially equal to each other in spite of a difference of about 0.1–0.2 mm in whole length between said two injection units.

* * * * *